Figure 1:
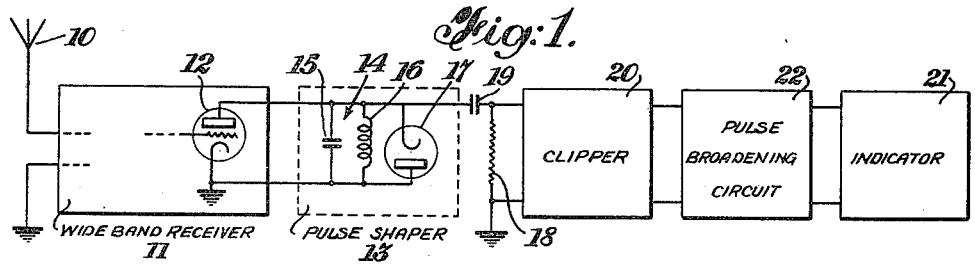

July 6, 1948. E. LABIN ET AL 2,444,455
STATIC REDUCING PULSE RECEIVER
Filed Sept. 9, 1943

INVENTORS
EMILE LABIN
ROSS B. HOFFMAN
BY
ATTORNEY

UNITED STATES PATENT OFFICE 2,444,455

STATIC REDUCING PULSE RECEIVER

Emile Labin, New York, N. Y., and Ross B. Hoffman, East Orange, N. J., assignors to Federal Telephone and Radio Corporation, Newark, N. J., a corporation of Delaware Application September 9, 1943, Serial No. 501,698

5 Claims. (Cl. 250—20)

This invention relates to radio receiver systems and more particularly to radio receivers for pulse communication in which are provided means for improving the signal-to-noise ratio.

Receiver circuits for receiving pulse energy are commonly used for obstacle detection purposes. In these systems signals in the form of pulses are reflected from an obstacle and the received pulses are applied to an indicator for indicating the time of transmission of the pulse so that an indication of the distance of the reflecting object may be observed. These systems also often utilize directive antennae which are aligned to produce a maximum indication so that by measurement of the relative amplitude of the received signals the direction of the object as well as the distance may be determined.

In obstacle indicating receivers, it is important that the receiver be constructed; (1) to deliver a pulse as closely spaced as possible to the next adjacent pulse so as to produce adequate resolving power in the receiver; (2) to deliver a pulse which has as closely as possible the same relative position in time as the incoming received pulse, producing an accuracy of measurement; (3) to deliver a pulse of as high an amplitude as possible and as noise free as possible for a given input pulse; and (4) to deliver pulses variable in relative amplitude in the same manner as the incoming pulses, so that direction indication may be made.

The first three of these important requirements are also important in receivers for time modulated pulse systems for transmitting intelligence. In neither of these types of systems is it necessary to faithfully reproduce the shape of the pulse in order that useful information may be obtained.

It is an object of our invention to provide a pulse receiver which is able to deliver pulses as closely as possible in the same relative position as the received pulses.

It is a further object of our invention to provide a pulse receiver which has a high ratio of signal-to-noise between the wanted pulse and noise pulses.

It is a still further object of our invention to provide a pulse receiver which is able to deliver pulses whose relative amplitudes are substantially in the same relationship as the amplitudes of the received pulses.

It is a still further object of our invention to provide a pulse receiver which is sensitive and as noise free as possible, and in which the time displacement of the pulses reproduced in the output thereof are substantially in the same relationship as the pulses received.

In accordance with a feature of our invention, there is provided a relatively wide band receiver, capable of receiving and amplifying the pulses without substantial distortion. These received pulses are then passed through a filter which may be either an ordinary sharply selective filter or a shock excited tuned circuit which will pass only a relatively low frequency harmonic of the pulse. At the output of this filter is provided a rectifier means which serves to substantially eliminate all of the produced waves except the first single half oscillation. The width of this single half oscillation will be determined by the frequency of the selective filter circuit and its amplitude will be largely dependent upon the amplitude of the harmonic content corresponding to the tuned filter frequency of the exciting wave. Noise energy such as static and other pulse-like interference which also impinges on the receiver is generally a series of narrow impulses spaced closely one to another at random, and the selective circuit by suppressing the low frequency components of the noise will reduce the noise energy without reducing much of the pulse amplitude. Consequently, the receiver will reproduce at its output the wanted waves at a greater amplitude than the noise energy, so that by passing only the output energy above a predetermined level substantially no noise will be passed. These output pulses will occur substantially in the same time relationship as the applied impulses; will be of substantially constant width; and will be relatively free from noise components. In addition, the pulses may be as closely spaced as one half cycle at the resonant frequency of the filter circuit and still be completely reproduced on the indicator whether the indicator be a position indicating screen or a pulse receiver system.

Figure 2:
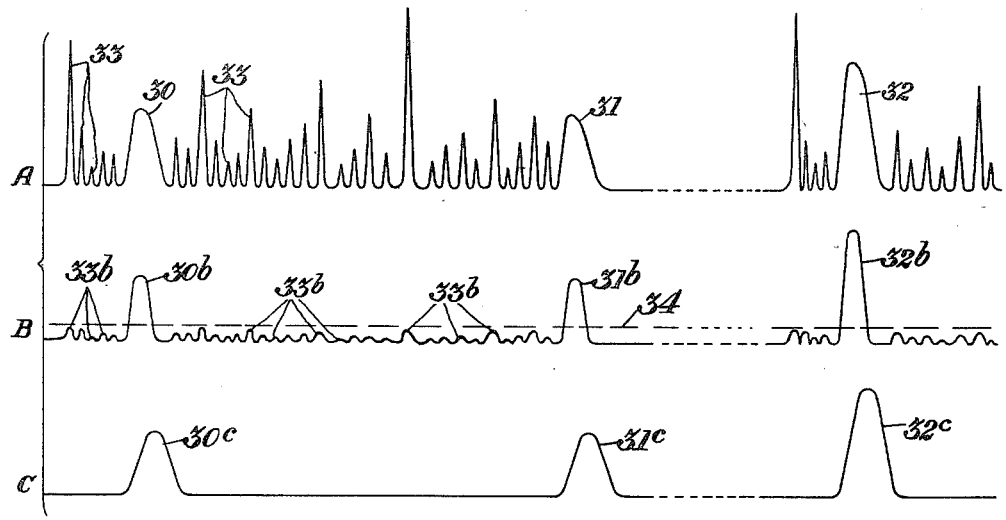

A better understanding of our invention and the objects and features thereof may be had by reference to the accompanying drawings, in which:

Fig. 1 is a block circuit diagram of a receiver in accordance with our invention; and Fig. 2 is a set of curves serving to illustrate the operation of the circuit of Fig. 1.

Turning first to Fig. 1, 10 represents a receiving antenna which may be of any desired type. In the event direction indications are desired, this antenna may be of a directional type and adjustable, if desired. The signals received on antenna 10 are applied to wide band receiver 11. This receiver should preferably be of such band width that it will readily pass the received pulses without substantial distortion. In the usual obstacle indication system or a pulse transmitting receiver, the band width of such receiver should cover substantially two megacycles. Only the center part of this band is required for the pulses, the remaining portion being necessary in order to assure lack of distortion. Receiver 11 preferably serves to detect the wave to reproduce the envelope of the incoming signal impulses which are applied finally to the tube 12 of the last stage of receiver 11.

In the plate circuit of tube 12 is provided a pulse shaper 13 which comprises a filter network 14 which may, for example, be a resonant circuit consisting of condenser 15 and inductance coil 16. This circuit may be shock excited by the input wave into oscillation at a predetermined frequency. This frequency preferably is a relatively low frequency component of the input impulse, for example, in the order of one or two hundred kilocycles. If the impulse front is in the order of one half to three microseconds in duration, then the frequency of the oscillator is such that a period thereof is substantially six times the duration of the front. Across the output of filter 14 is provided a rectifier 17 which permits the first positive peak of the shock excited wave to pass, but immediately short-circuits the other half of the cycle so that substantially only the first half-oscillation is passed.

In order that this first half-oscillation may have a relatively high amplitude, it is necessary that when a shock excited filter is used, the resonant quality or Q of the circuit be relatively low, but in order that the pulse be not spread too greatly at the base the damping should not be made too high. For example, a Q of between 20 to 50 may be used. With this value the first oscillation may be quite high in amplitude and still not be broadened greatly at the base. When circuits of extremely high quality are used, the build-up time in the oscillating circuit is so great that the first impulse of oscillation does not have sufficient amplitude.

The output of circuit 13 may then be coupled over a resistance 18 and condenser 19 to a clipper circuit 20 which serves to pass only the output pulses above the predetermined amplitude. This clipper may, for example, be a class C amplifier biased to pass only energy above a given level. From 20 the signals are applied to an indicator 21 which may be the normal cathode ray obstacle detection indicator or in the event modulated signals are being received may constitute the audio amplifier reproducer of the signals. In some instances, it is desired that the pulses after passing clipper 20 be broadened in order that a brighter indication may be obtained. For this purpose a pulse broadening circuit 22 may be provided between clipper 20 and indicator 21. This pulse broadening circuit may constitute another circuit similar in all respects to pulse shaper 13, but tuned to a still lower frequency so that the output pulses will be broadened to a wider value.

Turning to Fig. 2, the operation of the circuit of Fig. 1 may be better understood. In curve A of this figure, the wanted signal pulses are shown at 30, 31 and 32. In addition to the signal pulses applied to the receiver 11, there are numerous noise pulses 33 distributed at random and of random amplitudes. The signal pulses as well as the noise pulses are passed through receiver 11 and serve to shock excite circuit 14. However, as previously explained, the wanted pulses have considerably more of the low frequency harmonic present than do the noise pulses, so that the output signals from pulse shaper 13 tuned to this harmonic produce shapes substantially as shown at 30B, 31B, 32B on curve B of Fig. 2, while the noise output is reduced to a plurality of small ripples 33B as shown. It will be noted that in this instance the noise pulses are reduced to a lower amplitude than the wanted pulses, even though originally some of these noise pulses were greater in amplitude than the wanted pulses. Likewise, the wanted pulse 32B retains its relative amplitude relationship with respect to 30B and 31B in substantially the same relationship as existed between 32 and 30, 31. After passing through clipper 20 the energy below line 34 of curve B is eliminated so that substantially only noise free pulses are passed on to the indicator. When the pulse broadening circuit is used, pulses 30B, 31B and 32B after passing through this circuit take the broadened form shown at 30C, 31C and 32C of curve C.

In an experimental set-up the system described in the present invention was made with applied pulses of two to three microseconds in width. The amplitude of these pulses was changed so that variations in output amplitude could be observed. This circuit was then tried without the pulse shaper and clipper arrangement of the present invention and with the circuit alternately. The Q of circuit 14 was approximately 30. When signals were applied in which the signal-to-noise ratio was two without the pulse shaper arrangement of the invention, the introduction of this pulse shaper raised the signal-to-noise ratio to approximately 10, thus introducing a gain of about 14 decibels.

The same experiment was repeated with an original signal-to-noise ratio of 1 and in this case the improvement was found to be of from 6 to 8 decibels. However, by providing in addition the clipper circuit the noise energy may be substantially completely eliminated.

Although we have shown by way of example a particular circuit arrangement of our invention, it should be distinctly understood that many modifications and alterations thereof, will present themselves to those skilled in the art. As pointed out above, the pulse shaper 13 may constitute a sharp filter which is not capable of normal shock excitation, instead of the shock excited circuit as used. In this case, still only the first half-oscillation will be reproduced, since the pulses themselves are relatively short and the rectifier will serve to by-pass the remaining lower amplitude oscillations which might otherwise occur. It should also be understood that in addition to the obstacle detection features of this invention, the receiver circuit may be applied in all cases where it is desired to reproduce pulses free of noise interference while still retaining a desired spacing and relative amplitude features of the received pulses. Furthermore, in instances where it is not necessary to make the resolving power between adjacent pulses high, the width of the reproduced pulses may be made quite large in order that greater energy may be contained therein.

While we have described above the principles of our invention in connection with specific apparatus, and particular modifications thereof, it is to be clearly understood that this description is made only by way of example and not as a limitation on the scope of our invention as set forth in the objects of our invention and the accompanying claims.

What is claimed is:

1. A radio pulse receiver for reproducing received impulses in substantially the same relative time relation and the same relative amplitude as originally transmitted, and at the same time improving the signal-to-noise ratio of the signals, comprising filter means for passing substantially only a single frequency component of each received impulse, means for limiting each said passed component substantially to a single half-oscillation, to produce a pulse substantially the width of said half-oscillation, and means for passing only the portions of said pulses above a predetermined voltage level.

2. A radio receiver according to claim 1, wherein said filter means comprises a resonant circuit tuned to said single frequency component, and means for shock exciting said resonant circuit in response to received pulses.

3. A radio receiver according to claim 1, further comprising means for broadening said produced pulses to provide further pulses of predetermined width, and indicator means responsive to said broadened pulses.

4. A radio receiver according to claim 1, wherein said filter means comprises a resonant circuit tuned substantially to a frequency between two hundred and three hundred kilocycles, and having a resonance quality of between twenty and forty.

5. A radio receiver for reproducing received impulses in substantially the same relative time relation and the same relative amplitude as originally transmitted, comprising amplifier means for amplifying a series of received impulses, resonant circuit means tuned to a relatively single frequency component of each received impulse connected in the output of said amplifier for shock excitation thereby, rectifier means coupled across the output of said resonance means for passing substantially only the first half oscillation of the wave produced by said shock excitation, to produce a single pulse substantially of the width of said half oscillation and relatively free of noise, clipper means for limiting the produced pulses to values above a certain voltage level, and indicator means responsive to said limited produced pulses.

EMILE LABIN.
ROSS B. HOFFMAN.

REFERENCES CITED

The following references are of record in the file of this patent:

UNITED STATES PATENTS

| Number | Name | Date |
|---|---|---|
| 1,497,299 | Mills | June 10, 1924 |
| 2,153,202 | Nichols | Apr. 4, 1939 |
| 2,181,309 | Andrieu | Nov. 28, 1939 |
| 2,241,170 | Ulbricht | May 6, 1941 |
| 2,252,447 | Ulbricht | Aug. 12, 1941 |
| 2,270,773 | Sonnetag et al. | Jan. 20, 1942 |
| 2,294,341 | Moore | Aug. 25, 1942 |